(12) United States Patent
Nemet et al.

(10) Patent No.: US 9,249,738 B2
(45) Date of Patent: Feb. 2, 2016

(54) METHOD FOR AUTOMATIC CLOSED-LOOP CONTROL OF ONE OR MORE COMBUSTION TEMPERATURES IN A GAS TURBINE INSTALLATION AND METHOD FOR DETERMINATION OF THE WATER CONTENT IN THE WORKING FLUID OF A GAS TURBINE INSTALLATION

(75) Inventors: Anton Nemet, Nussbaumen (CH);
Stanka Kokanovic, Baden (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 1202 days.

(21) Appl. No.: 12/068,337

(22) Filed: Feb. 5, 2008

(65) Prior Publication Data
US 2010/0050591 A1 Mar. 4, 2010

(30) Foreign Application Priority Data
Feb. 16, 2007 (DE) .......................... 10 2007 008 296

(51) Int. Cl.
*F02C 9/28* (2006.01)

(52) U.S. Cl.
CPC .............. *F02C 9/28* (2013.01); *F05D 2270/112* (2013.01); *F05D 2270/16* (2013.01); *F05D 2270/303* (2013.01)

(58) Field of Classification Search
CPC ..................... F02C 9/28; F02C 7/1435; F05D 2270/301–2270/303

USPC ............. 60/39.281, 39.27, 39.26, 39.24, 776, 60/773

See application file for complete search history.

(56) References Cited

U.S. PATENT DOCUMENTS

| | | | | |
|---|---|---|---|---|
| 2,442,049 A | * | 5/1948 | Leighton | 123/559.1 |
| 2,861,420 A | * | 11/1958 | Lewis | 60/243 |
| 6,164,057 A | * | 12/2000 | Rowen et al. | 60/39.27 |
| 6,530,221 B1 | * | 3/2003 | Sattinger et al. | 60/725 |
| 6,584,775 B1 | * | 7/2003 | Schneider et al. | 60/775 |
| 6,708,496 B2 | * | 3/2004 | Gadde et al. | 60/773 |
| 6,837,055 B2 | * | 1/2005 | Rowe et al. | 60/773 |
| 2003/0192316 A1 | * | 10/2003 | Rowe et al. | 60/773 |
| 2006/0042262 A1 | * | 3/2006 | Ganev et al. | 60/773 |
| 2008/0178659 A1 | * | 7/2008 | Spinelli et al. | 73/29.01 |

FOREIGN PATENT DOCUMENTS

EP 1 231 369 8/2002

* cited by examiner

*Primary Examiner* — Andrew Nguyen
(74) *Attorney, Agent, or Firm* — Buchanan Ingersoll & Rooney PC

(57) ABSTRACT

The invention relates to a method for automatic closed-loop control of one or more combustion temperatures in a gas turbine installation, having the following steps: measurement of a plurality of temperatures of the working fluid of the gas turbine installation at various positions in the gas turbine installation, measurement of a plurality of pressures of the working fluid at different positions in the gas turbine installation, determination of the water content of the working fluid flowing through the gas turbine installation, taking account of the measured values, and setting of at least one combustion temperature for the gas turbine installation as a function of the determined water content.

21 Claims, 1 Drawing Sheet

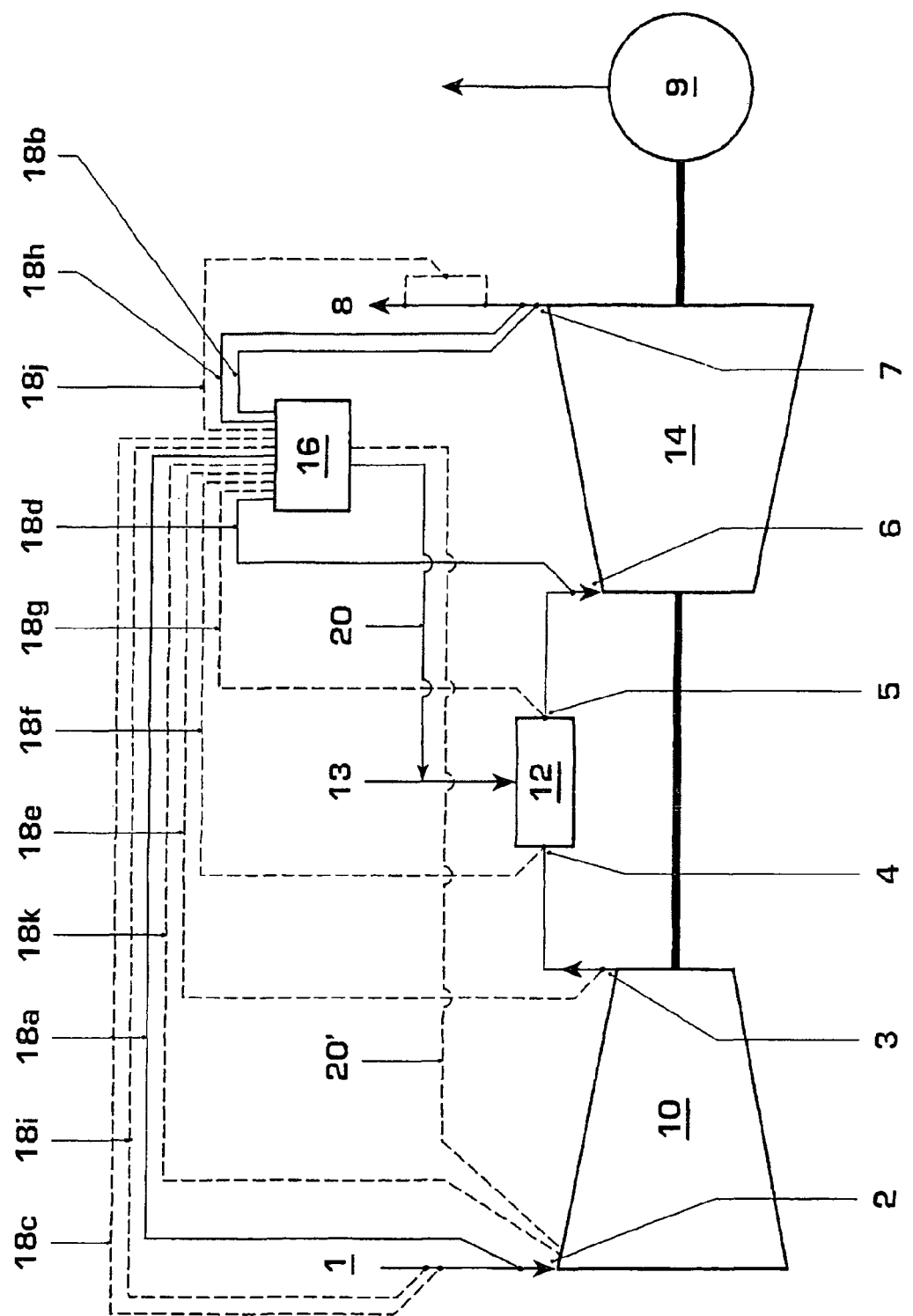

METHOD FOR AUTOMATIC CLOSED-LOOP CONTROL OF ONE OR MORE COMBUSTION TEMPERATURES IN A GAS TURBINE INSTALLATION AND METHOD FOR DETERMINATION OF THE WATER CONTENT IN THE WORKING FLUID OF A GAS TURBINE INSTALLATION

TECHNICAL FIELD

The invention relates to a method for automatic closed-loop control of one or more combustion temperatures in a gas turbine installation as claimed in claim 1, and to a method for determination of the water content in the working fluid of a gas turbine installation as claimed in claim 2.

BACKGROUND INFORMATION

According to the present prior art, the dominant influence of variation of the water content in the working fluid of a gas turbine installation and its effect on the operating characteristics of the individual gas turbine components have been investigated adequately and are sufficiently well known. This knowledge is of practical relevance in particular for closed-loop control of the combustion temperature of a gas turbine of a modern type, in order to make it possible to comply with the very stringent requirements for highly loaded components in these gas turbines, in terms of a life and emissions.

Closed-loop control of the combustion temperature of a gas turbine as a function of the water content of a working medium of the gas turbine is described in EP 1 231 369 A2. In this known closed-loop control, the water content of the air flowing into the gas-turbine compressor is determined and is used as a further parameter for determining the combustion temperature. One or more sensors is or are used to determine the water content and, in particular, is or are also placed downstream from water injection in the machine.

SUMMARY

One object of the present invention is now to propose an improved method for automatic closed-loop control of one or more combustion temperatures in a gas turbine installation. A further aim is to propose a method for determination of the water content in the working fluid of a gas turbine installation.

This object is achieved by a method for automatic closed-loop control of one or more combustion temperatures in a gas turbine installation having the features of claim 1, and by a method for determination of the water content in the working fluid of a gas turbine installation having the features of claim 2. Further refinements of the invention are specified in the dependent claims.

According to the invention, a method is provided for automatic closed-loop control of one or more combustion temperatures in a gas turbine installation, having the following steps:

measurement of a plurality of temperatures of the working fluid of the gas turbine installation at various positions in the gas turbine installation, measurement of a plurality of pressures of the working fluid at different positions in the gas turbine installation, determination of the water content of the working fluid flowing through the gas turbine installation, taking account of the measured temperature values and pressure values, and setting of at least one combustion temperature for the gas turbine installation as a function of the determined water content.

In this method, and in contrast to direct and technically complex moisture measurements in the machine, the water content of the working fluid flowing through the gas turbine installation is determined by indirect measurements and is used to set at least one combustion temperature for the gas turbine installation. In this case, the indirect measurements are pressure and temperature measurements which, in particular, are carried out more quickly than direct moisture measurements.

One major idea of the invention is to use pressure measurements to deduce the water content of the working fluid flowing through a gas turbine installation. One or more combustion temperatures in the installation can then be set automatically, in particular by computer control, as a function of the water content determined in this way. The method according to the invention offers an alternative to direct measurement of the working fluid composition and water content, in that the water content of the working fluid flowing through the turbine is determined by means of an indirect method based on pressure measurements. The determined water content is then taken into account by mathematical correlations in the algorithm for closed-loop control of the combustion temperature.

The method according to the invention makes use of pressure measurements to determine the total water content of the working fluid flowing through the turbine, and to set the gas turbine combustion temperature. The invention makes it possible to use the pressure and temperature measurement to achieve significantly better closed-loop control accuracy over a very wide range of environmental and load conditions on a gas turbine. In particular, the method according to the invention allows quicker compensation for the combustion temperature than the prior art, and therefore better overcombustion protection.

In particular, the invention is distinguished in that both the influence of all the externally injected amounts of water or vapor and the moisture in the air supplied with the combustion air from the surrounding area can be determined by an indirect measurement method, and it is possible to compensate safely and reliably for their influence on the calculation of the combustion temperature or temperatures.

According to one embodiment of the invention, the working fluid temperature and the compressor inlet temperature or the ambient temperature may be measured and may be taken into account in the determination of the water content of the working fluid flowing through the gas turbine installation.

According to a further embodiment of the invention, a pressure is measured upstream of the turbine inlet, and is taken into account in the determination of the water content of the working fluid flowing through the gas turbine installation. By way of example, the turbine inlet pressure, the compressor outlet pressure, the combustion chamber inlet pressure or the combustion chamber outlet pressure may be measured as the pressure upstream of the turbine inlet.

Furthermore, according to one embodiment of the invention, the turbine outlet pressure or the ambient pressure and the pressure loss from the turbine outlet to a chimney of the gas turbine installation is or are measured and is or are taken into account in the determination of the water content of the working fluid flowing through the gas turbine installation.

According to a further embodiment of the invention, the pitch angle of a set of compressor inlet guide vanes for the gas turbine installation is also measured and is taken into account in the determination of the water content of the working fluid flowing through the gas turbine installation.

According to a further embodiment of the invention, the ambient humidity is additionally measured in order to compensate continuously or at discrete times for possible effects resulting from ageing of and/or dirt in the gas turbine which can result in a change in the nominal induction flow rate characteristic of the compressor. This makes it possible to adjust the setting of the combustion temperature in the gas turbine installation as determined by taking account of a plurality of pressures of the working fluid.

In one development of the method according to the invention, mass flows of all the amounts of water/vapor which are supplied and emitted are taken into account in the determination of the water content of the working fluid flowing through the gas turbine installation. By way of example, water that is supplied by virtue of an evaporation cooler, water that is supplied by virtue of a "fogging" or "high fogging" system, water that is emitted by virtue of a cooler and/or water or vapor injection in order to increase the power or for closed-loop emission control either into the combustion chamber or into the cooling air system of the gas turbine are/is taken into account. According to one embodiment of the invention, in the method for automatic closed-loop control of one or more combustion temperatures in a gas turbine installation, the following closed-loop control structure is defined for closed-loop control of a combustion temperature $T_x$, where $T_x$ describes one or more of the combustion temperatures to be subjected to closed-loop control in the gas turbine installation:

$$T_x = f_1(T_7) \cdot f_2\left(\frac{p_6}{p_7}\right) \cdot f_3(T_2) \cdot f_4(x_d)$$

where $x_d$ denotes the water content in the working fluid and $f_1$, $f_2$, $f_3$ and $f_4$ are represented functionally by first and in particular higher order terms, in order to allow the process of polytropic expansion of the working fluid in the turbine to be recorded to as good an approximation as possible for the relevant operating range of the gas turbine, using the equation $$\frac{T_6}{T_7} = \left(\frac{p_6}{p_7}\right)^{\frac{n-1}{n}} = \left(\frac{p_6}{p_7}\right)^{\eta_p \cdot \frac{\kappa-1}{\kappa}}$$

According to one embodiment of the invention, the working fluid temperature $T_7$ is determined using the following equation:

$$T_7 = f_1^{-1}(T_x) \cdot f_2\left(\frac{p_6}{p_7}\right) \cdot f_3(T_2) \cdot f_4(x_d)$$

and one of the combustion temperatures $T_x$ or combinations of them are/is subjected to closed-loop control by comparing the working fluid temperature $T_7$ determined using the above equation directly with a measurement of the working fluid temperature $T_7$ and by keeping this at the nominal value by using a closed control loop to adjust the fuel valve position.

The invention also relates to a gas turbine installation comprising
  a compressor,
  at least one combustion chamber,
  at least one turbine and
  an apparatus which is designed to carry out a method for automatic closed-loop control of one or more combustion temperatures using one of the methods according to the invention, and to which measurement variables are supplied as input signals, are processed by it, and appropriate actuating signals for setting one or more combustion temperatures are produced as a function of this.

The apparatus for automatic closed-loop control is, according to one embodiment of the invention, a control computer to which measured values of the working fluid temperature, of the compressor inlet temperature or of the ambient temperature and a plurality of pressures of the working fluid in the gas turbine installation at various positions in the gas turbine installation are supplied as input signals, and which is designed such that it determines the water content of the working fluid flowing through the gas turbine installation taking account of the supplied input signals, and which produces actuating signals in order to set at least one combustion temperature in the gas turbine installation as a function of the determined water content.

According to one embodiment of the invention, the gas turbine installation may use sequential combustion with more than one combustion chamber or, according to one alternative embodiment of the invention, may have a single combustion chamber.

Further advantages and options for use of the present invention will become evident from the following description in conjunction with the exemplary embodiment illustrated in the drawing. The terminology and the associated reference symbols used in the following list of reference symbols are used throughout the description, the claims, the abstract and in the drawing.

BRIEF DESCRIPTION OF THE DRAWINGS

The single drawing shows a schematic of a gas turbine installation which is suitable for carrying out the method for closed-loop control of combustion temperatures, in particular the method according to a first implementation of the invention.

DETAILED DESCRIPTION

The single FIGURE shows, schematically, one example of a gas turbine installation in which the method according to the invention can be used. Ambient air 1 is passed into the inlet 2 of a compressor, by means of which the ambient air that has been inducted is compressed, in order to flow from the outlet 3 of the compressor into the inlet 4 of a combustion chamber 12. A fuel is injected into the combustion chamber 12 via a fuel supply line 13 and, together with the highly compressed air, results in a fuel/air mixture which can be ignited and is ignited in the combustion chamber 12. The hot working fluid which is created from the combustion of the mixture flows at a high pressure via a combustion chamber outlet 5 out of the combustion chamber 12 and into an inlet 6 of a turbine 14. The hot working fluid is expanded in the turbine 14, carrying out work, and is passed via a turbine outlet 7 and a chimney 8 into the atmosphere. The expansion of the hot working fluid results in the turbine 14 and a load that is coupled to it being driven, with the load being an electricity generator 9, for example. The electrical voltage of the electrical power produced by the generator 9 is transformed in a substation to an electrical voltage as required to feed to an electrical supply system.

In this gas turbine installation, the combustion temperature in the combustion chamber 12 is subjected to closed-loop control by a computer-aided closed-loop control apparatus 16 which, according to the invention, is supplied with a plurality of possible measured values as input signals via appropriate signal lines 18a-18k, with these input signals being processed by an algorithm which carries out the method according to the invention. (The FIGURE shows examples of possible signal lines for this purpose, with just a selection of the signal lines being sufficient for the invention, as will be explained in the following text in conjunction with variants of a first implementation of the method). An optimum setting for the combustion temperature is determined as a function of the processing of the supplied measured values by the closed-loop control apparatus 16. In order to achieve this optimum combustion temperature, an appropriate actuating signal is emitted via an actuating signal line 20 to the gas turbine installation, in particular to its burner control. For example, the actuating signal is used for closed-loop control of a valve in the fuel supply line 13. In one variant, an additional actuating signal line 20' can lead from the closed-loop control apparatus 16 to the row of compressor inlet guide vanes in order to transmit a further actuating signal for control of the position angle of the row of compressor inlet guide vanes.

In the method according to the invention, the water content in the working fluid is determined on the basis of pressure measurements, and the combustion temperature is subjected to closed-loop control corresponding to the influence of the water content. In addition, in the method, the mass flows of amounts of water which are supplied to and emitted from the gas turbine can be determined and can be taken into account for setting the combustion temperature or a plurality of combustion temperatures. This opens up a very much broader field of application for the method, for example for future use of gas turbine technology in carbon gasification or synthetic gas production installations.

Physical relationships of the working fluid, that is to say of the gas in the turbine will now be explained in the following text for understanding of the invention, illustrating how these relationships can be used on the basis of pressure measurements of the working fluid at various positions in the gas turbine to determine the water content in the working fluid according to the invention.

The invention is based on the generally known relationship for describing isotropic expansion in the turbine of a gas turbine (the indices in the following equations refer to the individual points annotated in FIG. 1):

$$\frac{T_6}{T_{7s}} = \left(\frac{p_6}{p_7}\right)^{\frac{\kappa-1}{\kappa}} \quad \text{(equation 1)}$$

where the parameter T denotes the measured temperature and p the measured pressure, and k denotes the isotropic coefficient.

Taking account of the irreversibility of the expansion process in an actual turbine, it is expedient to describe the relevant process using a polytropic state change:

$$\frac{T_6}{T_7} = \left(\frac{p_6}{p_7}\right)^{\frac{n-1}{n}} = \left(\frac{p_6}{p_7}\right)^{\eta_p \cdot \frac{\kappa-1}{\kappa}} \quad \text{(equation 2)}$$

In the special case of an ideal gas, the isotropic exponent k is defined by the relationship:

$$\kappa = \frac{c_p}{c_v} \quad \text{(equation 3)}$$

with the specific thermal capacities $c_p$ and $c_v$ once again being related to one another via the specific gas constant R:

$$c_p - c_v = R \quad \text{(equation 4)}$$

The change in the specific gas constant R which results from variation of the fuel composition and further operating parameters, for example the fuel/air ratio, as well as changes in the specific thermal capacities $c_p$ and $c_v$ lead to the isotropic exponent k being dependent on specific operating conditions. Furthermore, the load dependency of the characteristic for the polytropic turbine efficiency $\eta_p$, which can be determined on the basis of prototype measurements or detailed 3D-CFD computation methods, results in sufficient complexity for simulation of the actual turbine response using the above equation 2.

A further condition to be taken into account results from the relationship, which is generally known as the Stodola cone law for describing the absorption capacity of a turbine which, in the simplest formulation for ideal gases and ignoring boundary-layer effects by virtue of blade cooling, can be written as follows:

$$\dot{m}_{T,red}^* = \frac{\dot{m}_6}{\dot{m}_{6,0}} \cdot \frac{p_{6,0}}{p_6} \cdot \frac{\sqrt{R_6 \cdot T_6}}{\sqrt{R_{6,0} \cdot T_{6,0}}} = const \quad \text{(equation 5)}$$

where the index "0" in equation 5 denotes the design value of the relevant parameter in the design state of the turbine.

In particular, the above equation shows the influence of the specific gas constant $R_6$ at the turbine inlet which, if the temperature $T_6$ remains constant and the mass flow $m_6$ at the turbine inlet is assumed to be initially constant, leads to a rise in the turbine inlet pressure $p_6$ when the specific gas constant $R_6$ at the turbine inlet is increased as the water content in the working fluid increases, and vice versa.

Taking further account of the compressor characteristic in the formulation $$\dot{m}_{v,red}^* = \frac{\dot{m}_2}{\dot{m}_{2,0}} \cdot \frac{p_{2,0}}{p_2} \cdot \frac{\sqrt{R_2 \cdot T_2}}{\sqrt{R_{2,0} \cdot T_{2,0}}} = f(n_{red}^*, \pi_v) \quad \text{(equation 6)}$$

where $$n_{red}^* = \frac{n}{n_0} \cdot \frac{\sqrt{R_{2,0} \cdot T_{2,0}}}{\sqrt{R_2 \cdot T_2}} \quad \text{(equation 7)}$$

and $$\pi_v = \frac{p_3}{p_2} \quad \text{(equation 8)}$$

it can be seen that the compressor induction mass flow $m_2$ depends directly on the specific gas constant $R_2$ at the compressor inlet, and decreases as the moisture in the air increases, and vice versa.

The change which results from this in the mass flow $m_6$, which is initially still considered to be constant, at the turbine inlet leads in the end to superimposition of these two effects, which were previously considered to be independent, for the turbine and compressor, and which, because of the reaction on the description of the polytropic expansion according to equation 2, require particular consideration in the implementation of the relationships described above for closed-loop control of a gas turbine.

In particular, the present invention makes it possible to make use of the relationship as formulated above between the turbine inlet pressure $p_6$ and the working fluid water content by using an indirect method based on pressure measurements to deduce the water content of the working fluid flowing through the turbine. The described influence can then be compensated for, in particular, by mathematical correlations in the algorithm for closed-loop control of the combustion temperature. The closed-loop control implementation in this case depends substantially on the type and technical design of the gas turbine being used, and would therefore lead too far for the purposes of this description.

Various implementations of a method according to the invention for closed-loop control of a gas turbine will be explained in the following text with reference to the gas turbine parameters to be subjected to closed-loop control and the measurement variables to be taken into account for closed-loop control, based on FIG. 1 and the signal lines disclosed therein. Since the explained implementations are preferably implemented in the form of closed-loop control algorithms in closed-loop control apparatuses for a gas turbine installation, the following description deliberately avoids discussion of technical implementation details since this would necessitate the explanation of complex and specific computer programs, going beyond the scope of this description. Furthermore, the specific implementation in a closed-loop control system depends, as has already been indicated above, substantially on the type and design of the corresponding gas turbine, in particular on specific technical machine details.

In a first implementation, a method for closed-loop control of at least one of the combustion temperatures (or combinations of them) described in the following text relates to ensuring achievement of the specified component lives and emissions from a gas turbine installation:

- combustion chamber outlet temperature ($T_5$)
- turbine inlet temperature ($T_6$) in accordance with API 616
- turbine inlet temperature ($T_6'$ at the inlet to the first row of turbine rotor blades) in accordance with ANSI B 133.1
- turbine inlet temperature ($T_6$) in accordance with ISO 2314:1989

The following measurement variables are taken into account for carrying out the method:

- working fluid temperature at the turbine outlet ($T_7$, signal line 18b), and
- turbine inlet pressure ($p_6$, signal line 18d) or
- compressor outlet pressure ($p_3$, signal line 18e) or
- combustion chamber inlet pressure ($p_4$, signal line 18f) or
- combustion chamber outlet pressure ($p_5$, signal line 18g), and
- turbine outlet pressure ($p_7$, signal line 18h) or ambient pressure ($p_1$, signal line 18i) and pressure loss (signal lines 18j and 18h) from the turbine outlet to the chimney ($p_7$-$p_8$) and
- compressor inlet temperature ($T_2$, signal line 18a) or
- ambient temperature ($T_1$), signal line 18c).

Additionally, if applicable, it is also possible to measure the pitch angle of the row of compressor inlet guide vanes with this being supplied via a signal line 18k to the closed-loop control apparatus 16.

All the pressure measurements are absolute pressure measurements (total or static pressure) or gauge pressure (total or static).

FIG. 1 shows signal lines 18a, 18b, 18d and 18h as solid lines. These signal lines indicate a first variant of a gas turbine installation which is suitable for carrying out the first implementation of the method. The signal lines mentioned are used to transmit the turbine outlet temperature ($T_7$), the turbine inlet pressure ($p_6$), the turbine outlet pressure ($p_7$) and, respectively, the compressor inlet temperature ($T_2$). The other signal lines (18c, 18e-g, 18i-k) which are indicated by dashed lines show further variants of gas turbine installations for carrying out the method. The dashed signal lines correspond to lines for transmission of measured values to the closed-loop apparatus 16, as indicated in the above list.

A second implementation relates to extension of the method to compensate for the water content in the working fluid of the turbine by additionally taking account of the following measurement variables of the amounts of water/vapor supplied and emitted:

if applicable: mass flows of all amounts of water/vapor supplied and emitted, such as
- water supplied by virtue of an evaporation cooler,
- water supplied by virtue of a "fogging" or "high fogging" system,
- water emitted by virtue of a cooler,
- water/vapor injection in order to increase power or for closed-loop emission control (either into the combustion chamber or into the cooling air system of the gas turbine).

A third implementation likewise envisages extension of the first implementation in this case by defining a structure for an equation for closed-loop control of the combustion temperature $T_x$, where $T_x$ describes one of the temperatures or combinations of them mentioned in the first implementation above. In particular, taking account of the possible combinations for the measurement variables according to the first implementation, this results in the following closed-loop control structure in a general form:

$$T_x = f_1(T_7) \cdot f_2\left(\frac{p_6}{p_7}\right) \cdot f_3(T_2) \cdot f_4(x_d) \qquad \text{(equation 9)}$$

In this case, $x_d$ denotes the water content in the working fluid and $f_1$, $f_2$, $f_3$ and $f_4$ are represented functionally by first and in particular higher order terms, in order to allow the process of polytropic expansion according to equation 2 to be recorded to as good an approximation as possible for the relevant operating range of the gas turbine.

Finally, a fourth implementation relates to a method for closed-loop control of the working fluid temperature. The inversion of the formulation according to equation 3 in order to solve equation 9 based on the working fluid temperature $T_7$ leads to the following form:

$$T_7 = f_1^{-1}(T_x) \cdot f_2\left(\frac{p_6}{p_7}\right) \cdot f_3(T_2) \cdot f_4(x_d) \qquad \text{(equation 10)}$$

thus allowing closed-loop control of one of the combustion temperatures $T_x$ mentioned in the first implementation, or of combinations of them, directly, by directly comparing the calculated working fluid temperature $T_7$ from equation 10 with the measurement, and by maintaining the nominal value by using a closed control loop to adjust the fuel valve position.

The gas turbine installation illustrated in the FIGURE has one combustion chamber. As already mentioned, the method according to the invention is also suitable for gas turbine installations having more than one combustion chamber, for example with sequentially arranged combustion chambers.

LIST OF REFERENCE SYMBOLS

1. Surrounding air
2. Compressor inlet
3. Compressor outlet
4. Combustion chamber inlet
5. Combustion chamber outlet
6. Turbine inlet
7. Turbine outlet
8. Chimney
9. Generator
10. Compressor
12. Combustion chamber
14. Turbine
13. Fuel supply line
16. Computer control
18a-18k Signal lines for measurement variables (pressure and temperature, position angle of the row of compressor inlet guide vanes)
20. Actuating signal line for combustion temperature or temperatures
20'. Actuating signal line for the position angles of the row of compressor inlet guide vanes

The invention claimed is:

1. A method for automatic closed-loop control of one or more combustion temperatures in a gas turbine installation, comprising:
measuring a plurality of temperatures of a working fluid of the gas turbine installation at various positions in the gas turbine installation;
measuring a plurality of pressures of the working fluid at different positions in the gas turbine installation;
determining a water content of the working fluid flowing through the gas turbine using an indirect method based on turbine inlet pressure measurements to deduce the water content of the working fluid flowing through the turbine installation as a function of the temperatures and pressures measured at different respective locations in the gas turbine installation; and
setting of the one or more combustion temperatures for the gas turbine installation as a function of the determined water content,
wherein a closed-loop control structure is defined for closed-loop control of the one or more combustion temperatures $T_x$, where $T_x$ is defined by:

$$T_x = f_1(T_7) \cdot f_2\left(\frac{p_6}{p_7}\right) \cdot f_3(T_2) \cdot f_4(x_d)$$

where $x_d$ denotes the water content in the working fluid, $T_7$ is the working fluid temperature at the turbine outlet, $p_6$ is a turbine inlet pressure, $p_7$ is a turbine outlet pressure, $T_2$ is a compressor inlet temperature and $f_1$, $f_2$, $f_3$ and $f_4$ denote functions of the working fluid temperature at the turbine outlet, a ratio of the turbine inlet pressure and the turbine outlet pressure, the compressor inlet temperature, and the water content in the working fluid, respectively wherein a process of polytropic expansion of the working fluid in the turbine is approximated for a relevant operating range of the gas turbine, using an equation $$\frac{T_6}{T_7} = \left(\frac{p_6}{p_7}\right)^{\frac{n-1}{n}} = \left(\frac{p_6}{p_7}\right)^{\eta_p \cdot \frac{\kappa-1}{\kappa}}.$$

2. The method as claimed in claim 1, wherein the plurality of working fluid temperatures and the compressor inlet temperature or an ambient temperature are measured and are taken into account in the determination of the water content of the working fluid flowing through the gas turbine installation.

3. The method as claimed in claim 1, wherein the turbine inlet pressure, a compressor outlet pressure, a combustion chamber inlet pressure or a combustion chamber outlet pressure is measured and is taken into account in the determination of the water content of the working fluid flowing through the gas turbine installation.

4. The method as claimed in claim 1, wherein the turbine outlet pressure or an ambient pressure and a pressure loss from the turbine outlet to a chimney of the gas turbine installation is or are measured and is or are taken into account in the determination of the water content of the working fluid flowing through the gas turbine installation.

5. The method as claimed in claim 1, wherein the working fluid temperature at the turbine outlet and the turbine inlet pressure or a compressor outlet pressure or a combustion chamber inlet pressure or a combustion chamber outlet pressure, and the turbine outlet pressure or an ambient pressure and a pressure loss from the turbine outlet to a chimney and compressor inlet temperature or an ambient temperature are measured and are taken into account in the determination of the water content of the working fluid flowing through the gas turbine installation.

6. The method as claimed in claim 1, wherein ambient moisture is measured, and a value of the ambient moisture is used to compensate for ageing or dirt effects in the gas turbine.

7. The method as claimed in claim 1, wherein a pitch angle of a set of compressor inlet guide vanes for the gas turbine installation is measured and is used for calculating water content of the working fluid flowing through the gas turbine installation.

8. The method as claimed in claim 1, wherein mass flows of all amounts of water or vapor which are supplied and emitted are also taken into account in the determination of the water content of the working fluid flowing through the gas turbine installation.

9. The method as claimed in claim 8, wherein the mass flows includes water that is supplied as a consequence of an evaporation cooler.

10. The method as claimed in claim 8, wherein the mass flows includes water supplied by means of a fogging or high fogging system.

11. The method as claimed in claim 8, wherein the mass flows includes water which is emitted by virtue of a cooler.

12. The method as claimed in claim 8, wherein the mass flows includes water or vapor injection for increasing power or for closed-loop emission control either into a combustion chamber or into a cooling air system of the gas turbine.

13. A method for automatic closed-loop control of one or more combustion temperatures in a gas turbine installation, comprising:
measuring a plurality of temperatures of a working fluid of the gas turbine installation at various positions in the gas turbine installation;
measuring a plurality of pressures of the working fluid at different positions in the gas turbine installation;

determining a water content of the working fluid flowing through the gas turbine using an indirect method based on turbine inlet pressure measurements to deduce the water content of the working fluid flowing through the turbine installation as a function of the temperatures and pressures measured at different respective locations in the gas turbine installation; and setting of the one or more combustion temperature for the gas turbine installation as a function of the determined water content, wherein a working fluid temperature $T_7$ is determined using an equation:

$$T_7 = f_1^{-1}(T_x) \cdot f_2\left(\frac{p_6}{p_7}\right) \cdot f_3(T_2) \cdot f_4(x_d)$$

where $x_d$ denotes the water content in the working fluid, $T_7$ is the working fluid temperature at the turbine outlet, $p_6$ is a turbine inlet pressure, $p_7$ is a turbine outlet pressure, $T_2$ is a compressor inlet temperature and $f_1$, $f_2$, $f_3$ and $f_4$ denote functions of the working fluid temperature at the turbine outlet, a ratio of the turbine inlet pressure and the turbine outlet pressure, the compressor inlet temperature, and the water content in the working fluid, respectively, wherein one of the one or more combustion temperatures $T_x$ are subjected to closed-loop control by comparing the working fluid temperature $T_7$ determined using the equation directly with a measurement of the working fluid temperature $T_7$ and using the closed control loop to adjust a fuel valve position.

14. The gas turbine installation as claimed in claim 13, conFIGUREd to provide sequential combustion.

15. The gas turbine installation as claimed in claim 13, comprising one combustion chamber.

16. The method as claimed in claim 13, wherein the plurality of working fluid temperatures and the compressor inlet temperature or an ambient temperature are/is measured and are/is taken into account in the determination of the water content of the working fluid flowing through the gas turbine installation.

17. The method as claimed in claim 13, wherein the turbine outlet pressure or an ambient pressure and pressure loss from the turbine outlet to a chimney of the gas turbine installation is or are measured and is or are taken into account in the determination of the water content of the working fluid flowing through the gas turbine installation.

18. The method as claimed in claim 13, wherein the plurality of working fluid temperatures at the turbine outlet and the turbine inlet pressure or a compressor outlet pressure or a combustion chamber inlet pressure or a combustion chamber outlet pressure, and the turbine outlet pressure or an ambient pressure and a pressure loss from the turbine outlet to a chimney and the compressor inlet temperature or an ambient temperature is or are measured and is or are taken into account in the determination of the water content of the working fluid flowing through the gas turbine installation.

19. The method as claimed in claim 13, wherein an ambient moisture is additionally measured, and a value of the ambient moisture is used to compensate for ageing or dirt effects in the gas turbine.

20. The method as claimed in claim 13, wherein a pitch angle of a set of compressor inlet guide vanes for the gas turbine installation is also measured and is used for calculating the water content of the working fluid flowing through the gas turbine installation.

21. The method as claimed in claim 13, wherein mass flows of all amounts of water or vapor which are supplied and emitted are also taken into account in the determination of the water content of the working fluid flowing through the gas turbine installation.

* * * * *